Jan. 4, 1938. W. HAMEL 2,104,034
COIN CONTROLLED VENDING APPARATUS FOR ICE CREAM PACKAGES
Filed Dec. 23, 1935 2 Sheets-Sheet 1
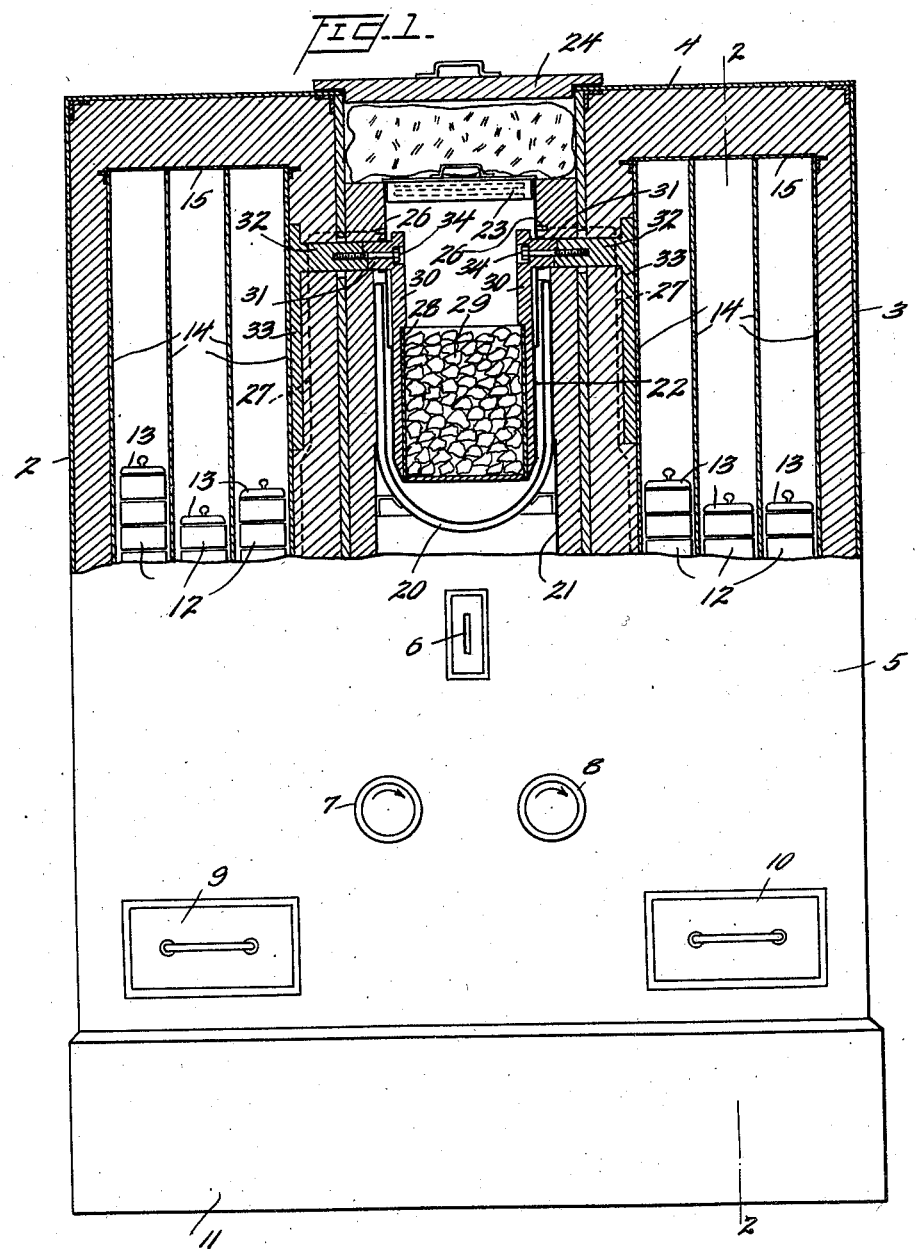

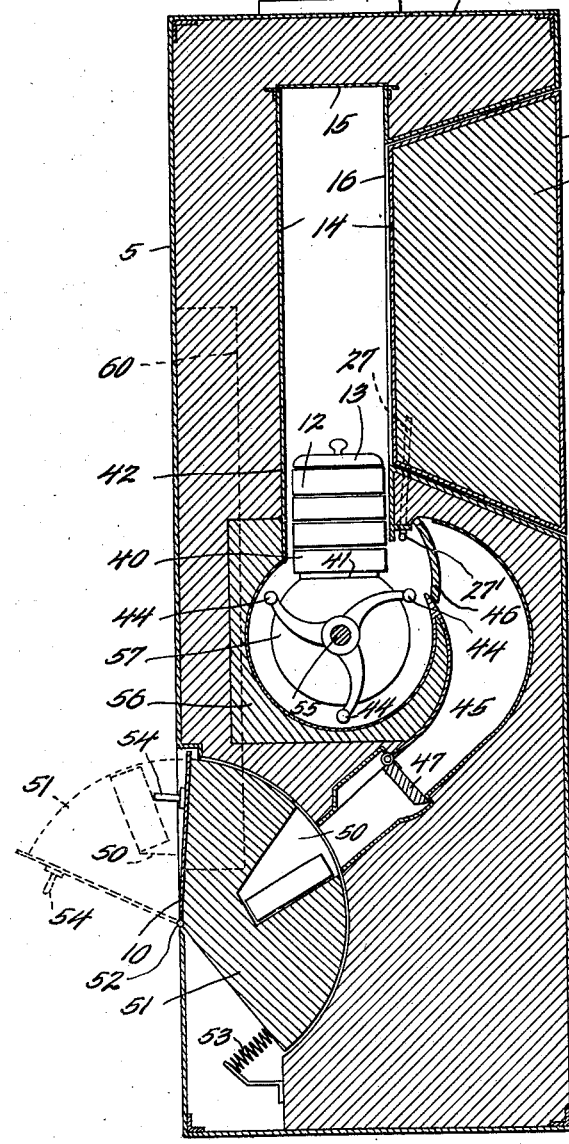

Patented Jan. 4, 1938

2,104,034

UNITED STATES PATENT OFFICE 2,104,034

COIN CONTROLLED VENDING APPARATUS FOR ICE CREAM PACKAGES

Wilhelm Hamel, Amsterdam, Netherlands, assignor to Carp's Handelsbureau voor Aviatiek en Scheepszaken N. V., Amsterdam, Netherlands, a Dutch company Application December 23, 1935, Serial No. 55,914
In Germany April 8, 1935

18 Claims. (Cl. 62—91.5)

The present invention relates to mechanism for vending perishable articles, such as packages of ice cream or the like.

One object of the invention is to provide a vending apparatus of this general type which is particularly adapted to receive and be refrigerated by solid carbon dioxide, commonly known as dry ice, and which is so constructed that it will consume minimum amounts of the refrigerant in performing its functions, in order to minimize operation costs, dry ice being a relatively expensive commodity, as is well-known. Not only is economy realized in the actual outlay for the refrigerant substance itself but considerable savings are effected due to reduction in servicing costs, the apparatus being designed and constructed so that renewal of the refrigerant is necessary only at widely spaced intervals of time.

The invention contemplates a simple form of apparatus but one which nevertheless has all of the essential features so designed that penetration of material quantities of heat into its interior is practically impossible the interior of the apparatus being always maintained at the necessary low temperature. Particularly, loss of efficiency due to the penetration of air currents into the apparatus has been guarded against. The construction of the apparatus is also such that, while especially suitable for use where dry ice is to be employed as a refrigerant, the articles to be dispensed are nevertheless so positioned with respect to the dry ice as not to be unduly cooled to the very low temperature of the dry ice itself, but only to a desired temperature, considerably above the temperature of the dry ice.

A further purpose is to provide a dispensing apparatus containing a minimum number of operating parts and in which the movable parts are so designed and so positioned with respect to the refrigerant that they may not be under any circumstances impeded in their operations by the formation of frost, a defect of many types of similar apparatus heretofore designed or constructed. Likewise the apparatus is so designed that the articles to be dispensed are cooled only to the desired low temperatures and are so supported and shielded that frost may not form thereon. Again the apparatus contemplated by the invention is operative at all times and under all weather conditions while at the same time is of such simple character that it may be made use of by all members of the public without difficulty. The dispensing apparatus may be varied as found necessary or desirable to handle packages or articles which vary in dimension or shape and may be recharged with such articles to be dispensed, or with refrigerating medium in a minimum time and with slight effort. Other objects and advantages of the invention will become apparent to one skilled in the art from the following description of a preferred and one modified form thereof, which are set forth by way of example.

In the accompanying drawings:

Figure 1 is a front elevation of the dispensing apparatus, partially broken away to show certain of the constructional interior details;

Figure 2 is a section on line 2—2 of Figure 1;

Figure 3 is a partial section through a slightly modified form of apparatus showing the details thereof which correspond to those disclosed in Figure 2.

The various parts of the apparatus are enclosed within a box-like casing having a back wall 1, side walls 2 and 3, top wall 4 and front wall 5, an aperture 6 for coins being formed in the front wall and this wall also having supported thereon the operating handles 7 and 8 and carrying the closure doors 9 and 10 for the article delivery ports. The remaining surface of the front of the casing is suitable for advertising matter and instructions indicating the manner in which it is to be used.

A base 11 may be employed as a support for the casing, which base may be omitted in the event that the casing is suspended or fastened to a wall. The articles to be dispensed are indicated at 12, these articles being assembled in vertical stacks, as shown, there being six of such stacks in the apparatus illustrated. Upon the uppermost article in each stack is preferably placed a weight 13 in order to insure that the stack of articles will be positively pressed downwardly when the dispensing mechanism hereinafter to be described is operated. The several stacks of articles 12 are retained within magazines, one on each side of the machine, each magazine comprising a plurality of walls 14, which walls are constructed of material having good heat conducting properties, the object being to maintain all parts of the magazines at substantially the same temperature. Preferably copper is employed in the construction of the magazine walls as this material is resistant to corrosion and is a good conductor of heat. The copper may be coated with tin if desired.

The several walls 14 comprise portions only of the completed magazine unit, these walls being united, by means of soldering, brazing, or welding, to the front and rear magazine walls so that heat may flow readily from one wall to another and all parts of the magazine thus caused to have substantially the same temperature. By varying the relative thicknesses of the walls 14, and the front and back walls of the magazines, the several parts of each magazine may be caused to have different heat conducting capacities and such variations in thickness as are necessary to attain the general object of uniformity of temperature at all points in the magazine may be, in this manner, effected. By doing this even the lower portions of the magazine may be maintained at substantially the same temperatures as the upper portions, or at lower temperatures, despite the fact that there is a tendency for the bottom of the magazine to become warmer than the upper portion, closer to the article delivery port than the top. Each magazine is covered at its top with a cover plate 15 fabricated of metal which is a poor conductor of heat, such as German silver, an alloy comprising substantially copper, nickel and zinc.

Each of the magazines is intended to be charged from the rear and portions of the rear or back walls of the magazines are therefore omitted, one such charging aperture being indicated at 16. In order that access may be had to this charging aperture, the back wall of the casing itself is provided with a registering aperture, normally closed by means of a door 17. If desired cover plates may be provided for each of the openings 16, which may be removed after the doors 17 are opened to render the magazines accessible. Door 17 is lined with a thick layer of insulating material 18 to prevent heat transfer between the adjacent magazine and the exterior air and in fact the entire interior of the casing is heavily lined with such material, as shown in the drawings. To further minimize the possibility of the penetration of heat to the magazines from the outside, sealing strips of rubber or the like may extend around the edge surfaces of the door, thus rendering it air-tight. Any suitable type of locking means may be made use of to secure the door in the position shown in Figure 2.

The apparatus is refrigerated by means of dry ice which, owing to its extreme low temperature, must necessarily be stored in a well insulated container. It has been found that a double walled glass container of the vacuum type is well suited for the purpose of insulating the dry ice, such container being indicated at 20 in the drawings. The space between the walls of container 20 is evacuated and hermetically sealed and the container is so positioned that it may not be reached and injured or broken in the operation of the apparatus. While the invention contemplates the use of one or more magazines of articles to be dispensed and one or more containers for dry ice, that form which is shown in the drawings and which has proven to be eminently satisfactory, includes a central container for dry ice and two magazines, one located on each side of the central container.

The double walled glass insulating member 20, or bell glass, is supported in a central compartment, resting upon a frame 21 and being enveloped by a soft insulating material. Within the glass bell 20 is located a cylindrical container 22, preferably formed of metal having poor heat conducting characteristics, such for instance as German silver or stainless or rustless iron or steel, the wall of this container being relatively thin. This cylindrical container is hermetically sealed by means of a tightly fitting cover 23 at its top and may, if desired, be made even more resistant to heat transfer through its walls by being constructed so as to have several parallel walls separated by air gaps or spaces, the members maintaining the concentric cylinders in spaced relationship being relatively thin so as to minimize the direct transfer of heat from one wall to the other. The cover 23 is removable for the purpose of charging the container 22 with dry ice and this cover is accessible through a port formed in the top wall of the cabinet, which port is normally closed by a cover 24. Additional insulation in the shape of a bag of insulating material may be placed between the covers 23 and 24, as shown in Figure 1.

A body of solid carbon dioxide within the container 22 is indicated at 29 and in the normal operation of the apparatus this material, or dry ice, will evaporate or gasify. Hence it is necessary to provide means for permitting the escape of the constantly evolving gases. In Figure 1 are illustrated diagrammatically at 26 tubes for the escape of the gaseous carbon dioxide, which tubes are relatively restricted, and extend downwardly from opposite sides of container 22 and discharge into the delivery ducts for articles to be dispensed, from which ducts it is highly desirable to exclude air at all times. The discharge ports for the gas conduits 27 are indicated at 27'. The gas escaping from the container 22 is of relatively low temperature and will maintain the ducts relatively cool as well as serving to exclude air.

Within container 22 are the vertically disposed members 30, which are formed of copper or other suitable heat conducting material and which are designed and intended to conduct heat transmitted from the compartments in which the magazines are located to the vicinity of the refrigerant. The vertically extending metallic strips 30 are provided at their upper ends with outwardly extending trunnion-like arms 31 the ends of which tightly engage the inner ends of arms 32 which last mentioned arms are, respectively. rigid with metallic bodies or plates 33, each such plate 33 closely engaging the adjacent inner wall 14 of the associated article magazine. A bolt 34 secures each arm 30 to the aligned arm 32 and the meeting ends of these arms are accurately machined so as to have full contact over their entire areas. It is by means of the interconnected members 33, 32, 31, and 30 that heat is withdrawn from each magazine compartment and transferred by conduction to the vicinity of the body 29 of dry ice. The body of dry ice 29 is in reality directly supported or contained within a copper container 28, secured to conducting strips 30 and the sealed outer container 22 is preferably supported in the position shown by the laterally extending arms comprising members 31 and 32.

Preferably the dry ice, when introduced into the container 22, is enclosed and supported within mesh or gauze bags of wire. By using different types of bags, having meshes of different sizes, the transfer of heat from the metallic container 28 to the body of dry ice may be also regulated, and hence the temperature in the magazine compartments controlled.

Referring now to Figure 2. It will be perceived that the lowermost package 40 of the column or stack of packages shown is supported upon a plate member 41 which forms a portion of the magazine structure and which is therefore also maintained at a low temperature. The front wall 42 of the magazine terminates at its lower end above the plate 41, leaving an aperture through which may pass an ejecting element 44, comprising a horizontally extending member supported upon the outer end of an arm rigid with a central hub, there being preferably three such members 44 and three such arms. The rear wall of the magazine likewise terminates sufficiently far above the horizontal plane of member 41 to provide an aperture through which the lowermost package 40 may be rearwardly projected. When the lowermost package 40 is pushed rearwardly by one or other of members 44 it is discharged into a downwardly extending channel or duct 45, which is curved as shown, and the walls of which are preferably formed of a metal such as German silver, which is a poor conductor of heat.

In order that there shall be no upward air flow toward the magazine compartments at any time automatically operating flap valves 46 and 47 are provided. Valve 46 is positioned closely adjacent the junction of duct 45 and the article compartment and is freely pivoted at 48 to the insulating material, being substantially vertically disposed when in normal position. An article 40 projected by member 44 will strike against and lift valve 46 and pass into duct 45. After it disengages the valve, the valve immediately falls under the influence of gravity to its original position. A somewhat similar valve 47, located further down the duct 45, is also freely pivoted at 49 but has a spring 58 for normally maintaining it in the position shown. After passing valve 46 package 40 will strike and deflect valve 47 against the action of spring 58 and this last mentioned valve will also immediately close after disengagement by the discharged article. The duct 45 and valves 46 and 47 are so shaped and supported that a discharged package or article cannot possibly be caught thereby. Also valves 46 and 47 are particularly designed to have low heat conducting properties, being preferably made of German silver and being double walled or hollow. The interiors of the valves may be filled with insulating materials, such as for instance capoc.

The article delivery means shown in Figure 2 is also in the nature of a valve. The article after passing valve 47 is received within a recess 50 formed in the surface of a segmental member 51. Member 51 is pivotally mounted at 52 in the metallic wall of the cabinet and is likewise so designed that it always automatically returns to the position in which it is shown in full lines in Figure 2 either under the action of gravity or the retractive action of a spring such as spring 53. Exteriorly the member 51 is provided with a handle 54 which may be grasped by a buyer so that this valve-like member may be drawn to the position in which it is shown in dotted lines, and the dispensed article 40 therefore made available.

Only one segmental delivery member 51 is necessary for each magazine, notwithstanding that each magazine has capacity for three stacks or columns of articles. Only one article is delivered at a time when the machine is operated and a single coin inserted, the arrangement being such that articles are withdrawn from the several stacks in sequence in order that the stacks may be simultaneously emptied. In order that this result may be achieved three ejecting members 44 are provided for each magazine being disposed at angles of 120° about the common supporting shaft 55. During each operating cycle of the article ejecting mechanism the shaft 55 is rotated through 120° in order that one package only may be ejected. The members 44 rotate within an annular space defined by members 56 and 57, these members having mutually facing concentric cylindrical surfaces and both being formed of insulating material. The rearwardly facing surface of member 56 comprises one wall of duct 45 while its forwardly facing surface abuts a corresponding surface of the insulating lining of the cabinet. Preferably member 56 is fabricated of German silver or like metal and may be formed as a hollow body and either evacuated or filled with insulating material such as capoc. The cylindrical member fills the central portion of the chamber formed within the member 56 and reduces the volume of the space at the lower end of the magazine so that there is no substantial volume of free gas at this point.

The shaft 55 is rotated when the corresponding operating handle 7 or 8 is actuated, through the instrumentality of the coin controlled mechanism, this last mentioned mechanism being not illustrated inasmuch as it forms no portion of the present invention. It may be said, however, that the coin controlled mechanism includes a coin checking device, mechanism which permits rotation of the shaft 55, and also a weighing mechanism which indicates the number of packages which have been sold since the total weight of all the coins of a given denomination which are introduced will clearly indicate the number of packages which have been dispensed. The weighing mechanism may be connected to the coin controlled mechanism to render the coin controlled mechanism inoperative when the desired number of packages have been sold, for example, effecting closure of the coin slot at the proper time.

The coin mechanism must in its entirety be well insulated so that the temperature of its working parts shall not be unduly reduced as otherwise frost would tend to form and to render it inoperative, also the lubricant necessarily employed would become too viscous. For this reason, therefore, the whole of the coin control mechanism is located without and effectively insulated from the colder parts of the apparatus. The dotted line 60 shown in Figure 2 indicates the position of the coin controlled mechanism, being effectively insulated from the dry ice compartment. In Figure 3 of the drawings a modified form of article delivery means is illustrated. On the shaft 55 shown in this figure is mounted a generally cylindrical member 61 formed of non-conducting material. This body 61 has formed in its periphery recesses 62 there being preferably three of these recesses arranged at angles of 120° to each other the three recesses being spaced from each other longitudinally of shaft 55, one in the vertical plane of each stack of articles to be dispensed. By such construction, as in the case of the apparatus shown in Figure 2, one article will be ejected for each 120° rotation of shaft 55, and articles will be removed from the several stacks in sequence. The recesses 62 are so formed, and so disposed that as each arises beneath a stack of articles the lowermost article or package in that stack will be deposited within it. At one side of the recess the article will project therefrom while a substantially radial wall 63 will rest against the opposite end of the article. It is obvious that if the member 61 is rotated in the direction of the arrow 64 the lowermost article 40 will be ejected into the duct or passage 65 but that the stack as an entirety will not descend, the cylindrical surface of member 61 which immediately succeeds the recess 62 passing under the lower surface of the lowermost article and supporting the entire stack. The cylindrical member 61 lies within a cylindrical recess formed in the insulating body or block 66, preferably made of material such as German silver, and filled with an insulating material such as capoc. With a construction such as shown, air is excluded and may not penetrate to the magazine at any time, the passages being so restricted as to possibly contain only small bodies of gasified carbon dioxide and preventing the occurrence of convection currents.

By reason of the use of this type of dispensing mechanism one article at a time may be withdrawn and dispensed while the remaining articles of the stack from which the dispensed article has just been removed will be supported within the magazine and in a very cold zone, even the lowermost article of the stack being maintained in a position in which it is effectively refrigerated. Preferably toothed wheels are employed to transmit motion to the shaft 55 since through driving mechanism of this type very little heat may be conducted.

The operating mechanism for shaft 55 shown in Figure 3 may be the same in type as that provided for the operation of the corresponding shaft shown in Figure 2 and the coin mechanism employed may also be identical, insertion of one coin permitting only one cycle of operation of the machine. Some form of detent or pawl and ratchet mechanism is provided to prevent counterclockwise movement of member 61.

Upon ejection of an article 40 it first strikes the valve 67 which is freely pivoted as at 68 so that it may readily swing. The article laterally displaces valve 67 and then falls downwardly by gravity through duct 65, valve 67 immediately closing thereafter, its lower edge fitting exactly against the cylindrical periphery of member 61 thus preventing any upward current of gas from passing into the magazine compartment. Valve 61 is likewise preferably made of sheet metal such as German silver, is hollow, and either evacuated or filled with an insulating material.

The package falling through duct 65 enters a cylindrical drum 70, passing through an aperture 73. Drum 70 is mounted for rotation about its longitudinal axis, being supported by pins or trunnions 71. Drum 70 is so weighted, or provided with spring means, that it normally occupies the position shown in Figure 3 and will return to this position in the direction of the arrow 72 after being rocked or revolved and released, the aperture 73 being therefore normally in register with the end of the duct 65. To remove a package or article which has entered drum 70 the operator will depress the operating handle 74 thus bringing the aperture 75 into view through which the article within the drum may be observed and through which such article may be removed. At the same time, and by the same movement of the drum, the aperture 73 is moved out of register with the duct 65 so that no air may flow into the duct while the article is being removed. The drum 70 may if desired be formed as a double walled drum in order to retard as much as possible the penetration of heat, if desired being made of German silver, and the space between the walls thereof evacuated or filled with insulating material.

An outer door is indicated at 77, this door being hinged to the casing front at 79 and being provided with a handle 78 by means of which it may be readily lifted. This door provides an additional safeguard against the penetration of warm air into the apparatus and of course is normally closed at all times.

Having thus described the invention, what is claimed as new and desired to be secured by Letters Patent is:

1. Vending apparatus comprising a cabinet having a compartment for articles, such as packages of ice cream, to be dispensed and an article discharge duct leading from said compartment to an article discharge port, insulating material wholly enclosing the article compartment and duct, except at the article discharge port, to prevent the penetration of heat into the same, a movable member located at the junction of the compartment and duct and remote from the article discharge port for removing articles singly from said compartment and transferring them to said duct, said member being wholly insulated by said insulating material save from the compartment and duct, and metallic means having a portion extending through the insulating material enclosing the compartment, for constantly withdrawing heat from said compartment and transmitting it to a colder zone.

2. Vending apparatus comprising a cabinet having a compartment for articles, such as packages of ice cream, to be dispensed and an article discharge duct leading from said compartment to an article discharge port, insulating material wholly enclosing the article compartment and duct, except at the article discharge port, to prevent the penetration of heat into the same, a movable member located at the junction of the compartment and duct and remote from the article discharge port for removing articles singly from said compartment and transferring them to said duct, said member being wholly insulated by said insulating material save from the compartment and duct, an automatically acting valve intermediate the discharge port and movable member and normally closing said duct, said valve being deflected from duct closing position by an article transferred into said duct by said member and immediately resuming duct closing position, and means for withdrawing heat from said compartment and transmitting it to a colder zone, said means including a metallic heat conducting member extending through the insulating material enclosing the compartment.

3. Vending apparatus comprising a cabinet having a compartment for articles, such as packages of ice cream, to be dispensed and an article discharge duct leading from said compartment to an article discharge port, insulating material wholly enclosing the article compartment and duct, except at the article discharge port, to prevent the penetration of heat into the same, a movable member located at the junction of the compartment and duct and remote from the article discharge port for removing articles singly from said compartment and transferring them to said duct, said member being wholly insulated by said insulating material save from the compartment and duct, a plurality of spaced valves intermediate the discharge port and movable member and normally closing said duct, one of said valves being deflected from duct closing position by an article transferred into said duct by said member and immediately thereafter automatically resuming duct closing position, and means for withdrawing heat from said compartment and transmitting it to a colder zone, said means including a metallic heat conducting member extending through the insulating material enclosing the compartment.

4. Vending apparatus comprising a cabinet having a compartment for articles, such as packages of ice cream, to be dispensed and an article discharge duct leading from said compartment to an article discharge port, insulating material wholly enclosing the article compartment and duct, except at the article discharge port, to prevent the penetration of heat into the same, a movable member located at the junction of the compartment and duct and remote from the article discharge port for removing articles singly from said compartment and transferring them to said duct, said member being wholly insulated by said insulating material save from the compartment and duct, an automatically acting valve intermediate the discharge port and movable member and normally closing said duct, said valve being movably supported upon said insulating material in such manner as to be deflectable from duct closing position by an article transferred into said duct by said member and immediately resuming duct closing position upon disengagement by said article, and means for withdrawing heat from said compartment and transmitting it to a colder zone, said means including a metallic heat conducting member extending through the insulating material enclosing the compartment.

5. In a vending machine for packages of ice cream or the like, a cabinet having a compartment for solid carbon dioxide and a package delivery duct extending downwardly toward a package delivery port, means located above said delivery port for delivering packages singly into said duct, and a relatively restricted conduit for leading gaseous carbon dioxide from said compartment and delivering it into said duct above said port.

6. In a vending machine for packages of ice cream or the like, a cabinet having a compartment for solid carbon dioxide and a package delivery duct extending downwardly toward a package delivery port, a movably supported closure for said port, means located above said delivery port for delivering packages singly into said duct, and a relatively restricted conduit for leading gaseous carbon dioxide from said compartment and delivering it into said duct.

7. In a vending machine for packages of ice cream or the like, in combination, a cabinet having a compartment for solid carbon dioxide and a package delivery duct leading downwardly to a package delivery port, a movably mounted closure member for said port for receiving a package issuing from said port and moving the same into position to be grasped from without the cabinet, said member closing said port when moved to package dispensing position, and a restricted insulated conduit for leading gaseous carbon dioxide from said compartment and delivering it into said duct.

8. Vending apparatus comprising a cabinet having a compartment for articles, such as packages of ice cream or the like, to be dispensed, and a duct leading downwardly from the lower end of said compartment to an article discharge port, insulating material wholly enclosing the compartment and duct, save at the article discharge port, to prevent heat penetration into the same, metallic means for conducting heat from the articles within the compartment through the insulation enclosing the same to a colder zone without the compartment, and means positioned at the junction of compartment and duct for removing articles singly from the compartment and projecting them into the duct.

9. Vending apparatus comprising a cabinet having a compartment for articles, such as packages of ice cream or the like, to be dispensed, and a duct leading downwardly from the lower end of said compartment to an article discharge port, insulating material wholly enclosing the compartment and duct, save at the article discharge port, to prevent heat penetration into the same, metallic means for conducting heat from the articles within the compartment through the insulation enclosing the same to a colder zone without the compartment, valve means in the duct for normally blocking the same against the upward passage of air while being displaceable to permit the downwardly movement of articles, and means for removing articles from the compartment and projecting them into the duct.

10. Vending apparatus comprising a cabinet having two compartments separated by an intermediate body of insulating material to prevent direct heat transfer from one compartment to the other, means for supporting a plurality of articles to be dispensed in one compartment, a metallic heat conducting member extending through said intermediate body, and means in the second compartment for retaining a body of dry ice, said means including an insulating bell glass disposed with its axis vertical and its open end uppermost, and a metallic container for directly supporting the dry ice, said container being suspended within the bell glass from means without the bell glass.

11. Vending apparatus comprising a cabinet having two compartments separated by an intermediate body of insulating material to prevent direct heat transfer from one compartment to the other, means for supporting a plurality of articles to be dispensed in one compartment, a metallic heat conducting member extending through said intermediate body, and means in the second compartment for retaining a body of dry ice, said means including a metallic container depending from and supported by said heat conducting member.

12. Vending apparatus comprising a cabinet having two compartments separated by an intermediate body of insulating material to prevent direct heat transfer from one compartment to the other, means for supporting a plurality of articles to be dispensed in one compartment, a metallic heat conducting member extending through said intermediate body, and means in the second compartment for retaining a body of dry ice, said means including a metallic container depending from and supported by said heat conducting member and a bell glass disposed coaxially with the container and enveloping the same upon sides and bottom.

13. Vending apparatus comprising a cabinet having two compartments separated by an intermediate body of insulating material to prevent direct heat transfer from one compartment to the other, means for supporting a plurality of articles to be dispensed in one compartment, a metallic heat conducting member extending through said intermediate body, and means in the second compartment for retaining a body of dry ice, said means including a sealed container having a small outlet port for gas, a removable top or lid and an aperture in the side wall thereof through which the said conducting member extends, and a second container enveloped by said sealed container and spaced therefrom, said second container being connected to said first mentioned heat conducting member by a second heat conducting member.

14. Vending apparatus comprising a cabinet having two compartments separated by an intermediate body of insulating material to prevent direct heat transfer from one compartment to the other, means for supporting a plurality of articles to be dispensed in one compartment, a metallic heat conducting member extending through said intermediate body, and means in the second compartment for retaining a body of dry ice, said means including a sealed container having a small outlet port for gas, a removable top or lid, and an aperture in the wall thereof through which the said conducting member extends, an open topped container within the sealed container and spaced from the wall thereof, and a second heat conducting member connecting said last mentioned container and said first mentioned heat conducting member.

15. The combination set forth in claim 14 in which said open topped container is fabricated of metal having good heat conducting properties and the sealed container is fabricated of metal having poor heat conducting properties.

16. The combination set forth in claim 14 in which a bell glass envelops the lower end of the sealed container.

17. A dry ice receptacle comprising a closed thin walled metal container having an aperture near its top for the escape of gas at a high level, metallic heat conductors projecting through apertures formed in the walls of such container and having portions within the container depending toward the bottom thereof and a second container for directly carrying dry ice secured to the depending portions of said first container.

18. A dry ice receptacle comprising coaxially arranged containers, one within and enveloped by the other, heat conducting members extending parallel to the common axis of said containers and intermediate the same, the inner container being secured to said heat conducting members and the heat conducting members having portions projecting laterally through the wall of the outer container.

WILHELM HAMEL.